(12) United States Patent
Kowalkowski et al.

(10) Patent No.: US 9,194,268 B2
(45) Date of Patent: Nov. 24, 2015

(54) EXHAUST GAS TREATMENT SYSTEM INCLUDING AN ENHANCED SCR DIAGNOSTIC UNIT

(71) Applicant: GM Global Technology Operations LLC, Detroit, MI (US)

(72) Inventors: Janean E. Kowalkowski, Northville, MI (US); Amr Radwan, Canton, MI (US); Sarah Funk, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 14/053,054

(22) Filed: Oct. 14, 2013

(65) Prior Publication Data

US 2015/0101310 A1    Apr. 16, 2015

(51) Int. Cl.

| F01N 3/10 | (2006.01) |
|---|---|
| F01N 3/20 | (2006.01) |
| F01N 3/08 | (2006.01) |
| F01N 9/00 | (2006.01) |
| F01N 11/00 | (2006.01) |

(52) U.S. Cl.
CPC ............ *F01N 3/2066* (2013.01); *F01N 3/0885* (2013.01); *F01N 3/208* (2013.01); *F01N 9/002* (2013.01); *F01N 11/00* (2013.01); *F01N 2570/04* (2013.01)

(58) Field of Classification Search
USPC ............ 60/274, 276, 286, 295, 297, 301, 311
See application file for complete search history.

(56) References Cited

U.S. PATENT DOCUMENTS

| 7,207,171 B2* | 4/2007 | Nagaoka et al. ................. 60/295 |
| 7,267,991 B2* | 9/2007 | Ceccarini et al. ............. 436/119 |
| 7,409,821 B2* | 8/2008 | Miura .............................. 60/277 |
| 7,980,064 B2* | 7/2011 | Shamis et al. ................... 60/295 |
| 8,151,555 B2* | 4/2012 | Niimi et al. ...................... 60/286 |
| 8,375,706 B2* | 2/2013 | Iida et al. ......................... 60/295 |

* cited by examiner

*Primary Examiner* — Binh Q Tran
(74) *Attorney, Agent, or Firm* — Cantor Colburn LLP

(57) ABSTRACT

Embodiments of the invention include a method for performing diagnostics of a selective catalytic reduction ("SCR") device in an exhaust gas treatment system of an internal combustion engine. The method includes monitoring an amount of sulfur in the SCR device of the exhaust treatment system and monitoring, by an SCR diagnostics module, an efficiency of the SCR device and indicating when the efficiency of the SCR device falls below an efficiency diagnostics threshold. Based on determining that the amount of sulfur in the SCR device is above a first threshold, the method includes disabling an operation of the SCR diagnostics module.

20 Claims, 3 Drawing Sheets

EXHAUST GAS TREATMENT SYSTEM INCLUDING AN ENHANCED SCR DIAGNOSTIC UNIT

FIELD OF THE INVENTION

Exemplary embodiments of the subject invention relate to exhaust gas treatment systems of an internal combustion engine and, more particularly, a SCR sulfurization system including an enhanced SCR diagnostic unit.

BACKGROUND

Exhaust gas emitted from an internal combustion engine, particularly a diesel engine, is a heterogeneous mixture that contains gaseous emissions such as, but not limited to, carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

One type of exhaust treatment technology for reducing CO and HC emissions is an oxidation catalyst ("OC") device. The OC device includes a flow-through substrate and a catalyst compound applied to the substrate. One type of exhaust treatment technology for reducing NOx emissions is a selective catalytic reduction ("SCR") device that may be positioned downstream of the OC device. The SCR device includes a flow-through substrate, having a SCR catalyst compound applied to the substrate.

During operation of the engine, the components of the after treatment system are exposed to sulfur from the fuel as well as the engine oil that are consumed by the engine. Over time as the sulfur accumulates, this affects the performance of the SCR catalyst as well as the oxidation catalyst. The sulfur is released from the catalysts of the OC device and the SCR device at relatively high temperatures (e.g., typically about 500° C. or greater), resulting in desulfurization.

Currently, an SCR efficiency diagnostic unit monitors the efficiency of the SCR device and indicates a failure of the SCR device if the efficiency of the SCR device falls below a threshold value. However, during normal operation of the SCR device high levels of sulfur in the SCR device may cause the SCR efficiency diagnostic unit to falsely indicate a failure of the SCR device. Accordingly, it is desirable to operate the SCR efficiency diagnostic unit to prevent false indications of a failure of the SCR device.

SUMMARY OF THE INVENTION

In one exemplary embodiment, a controller for operating an exhaust gas treatment system included with an internal combustion engine is provided. The controller includes a stored sulfur module configured to determine an amount of sulfur in a selective catalytic reduction ("SCR") device of the exhaust treatment system and a SCR diagnostics module configured to monitor an efficiency of the SCR device and to indicate a fault when the efficiency of the SCR device falls below an efficiency diagnostics threshold. The operation of the SCR diagnostics module is disabled when the amount of sulfur in the SCR device is above a first threshold.

In another exemplary embodiment, a method for performing diagnostics of a selective catalytic reduction ("SCR") device in an exhaust gas treatment system of an internal combustion engine is provided. The method includes monitoring an amount of sulfur in the SCR device of the exhaust treatment system and monitoring, by an SCR diagnostics module, an efficiency of the SCR device and indicating a fault of the SCR device when the efficiency of the SCR device falls below an efficiency diagnostics threshold. Based on determining that the amount of sulfur in the SCR device is above a first threshold, the method includes disabling an operation of the SCR diagnostics module.

In a further exemplary embodiment, a controller for operating an exhaust gas treatment system of an internal combustion engine is provided. The controller includes a stored sulfur module configured to determine an amount of sulfur in a selective catalytic reduction ("SCR") device of the exhaust treatment system and a SCR diagnostics module configured to monitor an efficiency of the SCR device and to indicate a fault when the efficiency of the SCR device falls below an efficiency diagnostics threshold. The operation of the SCR diagnostics module is disabled when a frequency of regeneration of a diesel particulate filter ("PF") of the exhaust gas treatment is below a lower threshold.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
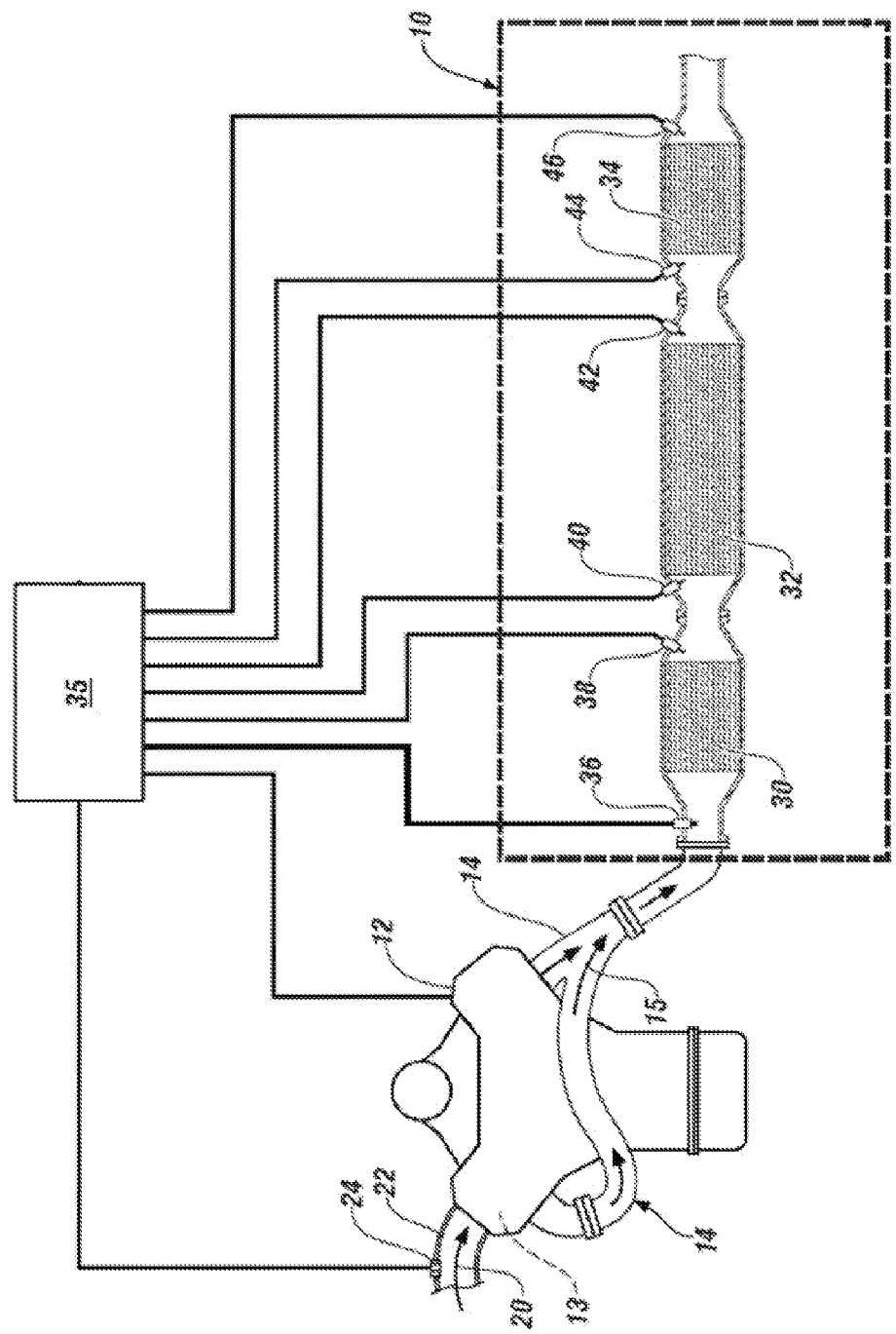
FIG. 1 is a schematic diagram of an internal combustion engine having an exhaust gas treatment system in accordance with exemplary embodiments.

The following description is merely exemplary in nature and is not intended to limit the present disclosure, its application or uses. It should be understood that throughout the drawings, corresponding reference numerals indicate like or corresponding parts and features.

As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Referring now to FIG. 1, exhaust gas treatment system 10 of an internal combustion (IC) engine 12 is illustrated according to an exemplary embodiment. The engine may include, but is not limited to, a diesel engine, gasoline engine, and a homogeneous charge compression ignition engine. In addition, the exhaust gas treatment system 10 described herein may be implemented in any of the engine systems mentioned above. The engine 12 is configured to receive an intake air 20 from an air intake passage 22. The intake air passage 22 includes an intake mass air flow sensor 24 to determine the intake air mass of the engine 12. In one embodiment, the intake mass air flow sensor 24 may include either a vane meter or a hot wire type intake mass air flow sensor. However, it is appreciated that other types of sensors may be used as well. An exhaust gas conduit 14 may convey exhaust gas 15 from the engine 12. The exhaust gas conduit 14 may include one or more segments containing one or more aftertreatment devices of the exhaust gas treatment system 10, as discussed in greater detail below.

Referring still to FIG. 1, exhaust gas treatment system 10 further includes a first oxidation catalyst ("OC") device 30, a selective catalytic reduction ("SCR") device 32, and a particulate filter device (PF) 34. It is appreciated that in some embodiments the exhaust gas treatment system 10 may include various combinations of one or more of the aftertreatment devices shown in FIG. 1, and/or other aftertreatment devices (e.g., lean NOx traps), and is not limited to the present example.

The OC device 30 may include, for example, a flow-through metal or ceramic monolith substrate that is packaged in a stainless steel shell or canister having an inlet and an outlet in fluid communication with exhaust gas conduit 14. The substrate may include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combinations thereof. The OC device 30 may treat unburned gaseous and non-volatile HC and CO, which are oxidized to form carbon dioxide and water.

The SCR device 32 may be disposed downstream from the OC device 30. The SCR device 32 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which may operate efficiently to convert NOx constituents in the exhaust gas 15 in the presence of a reductant such as ammonia.

The PF device 34 may be disposed downstream from the SCR device 32, and filters the exhaust gas 15 of carbon and other particulate matter. According to at least one exemplary embodiment, the PF device 34 may be constructed using a ceramic wall flow monolith exhaust gas filter substrate that is wrapped in an intumescent or non-intumescent mat (not shown) that expands, when heated to secure and insulate the filter substrate which is packaged in a rigid, heat resistant shell or canister. The shell of the canister has an inlet and an outlet in fluid communication with exhaust gas conduit 14. It is appreciated that the ceramic wall flow monolith exhaust gas filter substrate is merely exemplary in nature and that the PF device 34 may include other filter devices such as wound or packed fiber filters, open cell foams, of sintered metal fibers, for example.

Exhaust gas 15 entering the PF device 34 is forced to migrate through porous, adjacently extending walls, which capture carbon and other particulate matter from the exhaust gas 15. Accordingly, the exhaust gas 15 is filtered prior to being exhausted from the vehicle tailpipe. As exhaust gas 15 flows through the exhaust gas treatment system 10, the PF device 34 realizes a pressure drop across the inlet and the outlet. Further, the amount of particulates deposited in the PF device 34 increases over time, thereby increasing the exhaust gas backpressure realized by the engine 12. The regeneration operation burns off the carbon and particulate matter collected in the filter substrate and regenerates the PF 34.

A control module 35 is operably connected to and monitors the engine 12 and the exhaust gas treatment system 10 through a plurality of sensors. FIG. 1 illustrates the control module 35 in communication with the engine 12, the intake mass air flow sensor 24, and various other sensors. In at least one embodiment, the sensors include first and second sensors 36, 38 to determine the operational profile of the OC device 30, third and fourth sensors 40, 42 to determine the operational profile of the SCR device 32, and fifth and sixth sensors 44, 46 to determine the operational profile of the PF 34. In exemplary embodiments, the operation profiles of the OC device 30, the SCR device 32 and the PF device 34 may include, but is not limited to, the change in the temperature and pressure between the input and output of the devices.

In exemplary embodiments, the control module 35 determines an amount of sulfur that is stored on at least one aftertreatment device (e.g., the OC device 30, and the SCR device 32) since a previous or last desulfurization cycle. The desulfurization cycle may be initiated by the control module 35 based on a variety of triggering conditions as further described herein. During the desulfurization cycle, the OC device 30 and the SCR device 32 are subjected to elevated temperatures (generally above about 500° C.) to release sulfur stored on the catalysts. In the exemplary embodiment as shown, the control module 35 includes control logic to determine the amount of sulfur that is stored on the OC device 30, and the SCR device 32, as well as monitoring a number of trigger conditions to perform a desulfurization process. It is to be understood that various combinations and arrangements of aftertreatment devices (e.g., OC devices and/or SCR devices) may be used as well, depending on the configuration of the exhaust gas treatment system 10.

In one embodiment, the control module 35 includes control logic to calculate an exhaust mass flow located within the exhaust gas conduit 14. The exhaust mass flow is based on the intake air mass of the engine 12, which is measured by the intake air mass airflow sensor 24 as well as a fuel mass flow of the engine 12. Specifically, the exhaust mass flow is calculated by adding the intake air mass of the engine 12 and the fuel mass flow of the engine 12. The fuel mass flow is measured by summing the total amount of fuel injected into the engine 12 over a given period of time (e.g., since the last engine cycle). The fuel mass flow is added to the air mass flow rate to calculate the exhaust mass flow of the engine 12.

Figure 2:
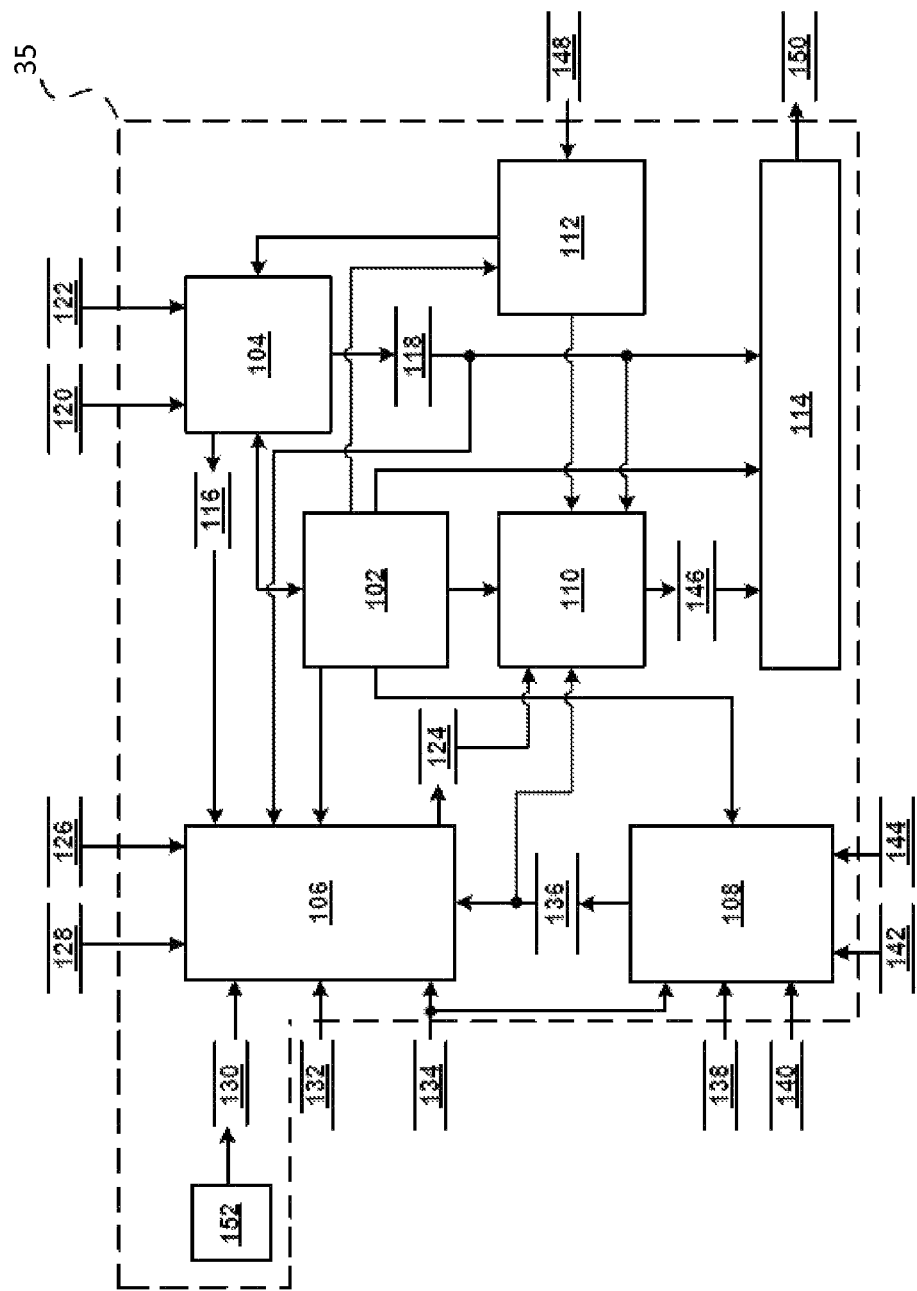
FIG. 2 is a block diagram illustrating a control module that determines an amount of sulfur that is stored on at least one after treatment device in accordance with exemplary embodiments.

FIG. 2 is a block diagram illustrating a control module that determines an amount of sulfur stored on at least one after treatment device according to an exemplary embodiment. Various embodiments of the exhaust gas treatment system 10 of FIG. 1 according to the present disclosure may include any number of sub-modules embedded within the control module 35. As can be appreciated, the sub-modules shown in FIG. 2 may be combined or further partitioned as well. Inputs to the control module 35 may be sensed from the exhaust gas treatment system 10, received from other control modules (not shown), or determined by other sub-modules or modules. In the embodiment as shown in FIG. 2, the control module 35 includes a memory 102, a regeneration control module 104, a desulfurization mode trigger module 106, a stored sulfur model 108, a desulfurization control module 110, an interrupt module 112, and a fuel injection control module 114.

In one embodiment, the memory 102 of the control module 35 stores a number of configurable limits, maps, and variables that are used to control desulfurization of after treatment devices, such as the OC device 30, the SCR device 32, and the PF device 34 of FIG. 1. Each of the modules 104-114 interfaces with the memory 102 to retrieve and update stored values as needed. For example, the memory 102 can provide values to the regeneration control module 104 for supporting determination of a soot load 116 and thresholds for determining a regeneration mode 118 based on vehicle operating conditions 120 and exhaust conditions 122. The memory 102 can also store a number of PF device 34 regenerations initiated by the regeneration control module 104.

The regeneration control module 104 may apply methods known in the art to determine when to set the regeneration mode 118. For example, the regeneration mode 118 may be set when the soot load 116 exceeds a threshold defined in the memory 102. Regeneration of the PF device 34 of FIG. 1 can be based on or limited according to vehicle operating conditions 120 and exhaust conditions 122. The vehicle operating conditions 120 and the exhaust conditions 122 can be provided by sensors or other modules. For example, the sensors 44, 46 (FIG. 1) send electrical signals to the control module 35 to indicate a temperature profile of the PF device 34. Factors such as engine speed, exhaust temperature, time elapsed since a last regeneration, distance traveled since a last regeneration, and a modeled soot level, for example, can also be used to determine when the regeneration mode 118 should be set.

The desulfurization mode trigger module 106 is configured to set a desulfurization request 124 based on one or more trigger conditions. The trigger conditions may be defined relative to a number of parameters and threshold values. The desulfurization mode trigger module 106 can receive the soot load 116, the regeneration mode 118, an engine operating time 126, a distance traveled 128, a pending SCR performance fault 130, an elapsed regeneration time 132, an amount of fuel consumed 134, and a total amount of sulfur stored 136. The engine operating time 126, distance traveled 128, and amount of fuel consumed 134 can be determined by monitoring the engine 12 of FIG. 1.

The SCR device 32 can store sulfur that is in the exhaust gas treatment system 10 and the conversion efficiency of the SCR device 32 degrades as the amount of stored sulfur increases. In exemplary embodiments, an SCR diagnostics module 152 is configured to measure the efficiency of the SCR device 32 and to compare the measured efficiency to a fault threshold efficiency. Upon determining that the measured efficiency exceeds the fault threshold efficiency, the SCR diagnostic module 152 transmits a pending SCR performance fault 130 to the control module 35. In exemplary embodiments, the pending SCR performance fault 130 generated by the SCR diagnostics module 152 indicates that the SCR device 32 has failed and may need to be replaced.

The elapsed regeneration time 132 may be determined by timing transitions of the regeneration mode 118 or may be received as a value from the memory 102 or the regeneration control module 104. The total amount of sulfur stored 136 is received from the stored sulfur model 108. The desulfurization mode trigger module 106 also retrieves values from the memory 102 to determine trigger conditions, such as: an upper sulfur threshold, an engine operating time threshold, a fuel consumption threshold, a distance traveled threshold, a regeneration time threshold, a soot load threshold, and the number of PF device regenerations.

The stored sulfur model 108 determines the total amount of sulfur stored 136 based on the amount of fuel consumed 134, an amount of oil consumed 138, an exhaust temperature value 140, a mass adsorbed value 142, an exhaust mass flow 144, and parameters from the memory 102. The parameters from the memory 102 can include a sulfur exposure from fuel value, a sulfur exposure from oil value, and a capture rate value. The sulfur exposure from fuel value is a calibratable scalar value that is based on the nominal value of an amount of sulfur that is generally found in the fuel of the engine 12 of FIG. 1. The sulfur exposure from oil value is also a calibratable scalar value that is based on the nominal value of the amount of sulfur that is generally found in the oil of the engine 12 of FIG. 1. The sulfur exposure from fuel value and the sulfur exposure from oil value may depend on specific regulations, and are expressed in units of mass concentration such as, for example, milligrams per liter.

The capture rate value is a value that represents an amount of sulfur that is actually transmitted to the exhaust gas conduit 14 (shown in FIG. 1) and stored on an aftertreatment device. That is, the exhaust aftertreatment system 10 is exposed to a portion of the sulfur present in the fuel and oil that the engine 12 has consumed during operation, which is the capture rate value. In one embodiment, the capture rate value may be determined by testing of the catalyst wash coat of the OC device 30, and the SCR device 32 (e.g., chemical analysis of the exhaust gas that enters and exits the OC device 30 and the SCR device 32).

The stored sulfur model 108 is configured to determine a total amount of sulfur in at least one aftertreatment device as a combined sulfur adsorption and desorption value. As described in U.S. patent application Ser. No. 13/423,617, filed Mar. 19, 2012 to Funk et al., entitled "SYSTEM TO DETERMINE SULFUR STORAGE OF AFTERTREATMENT DEVICES", and incorporated by reference in its entirety, the total amount of sulfur 136 can be determined as a rate of sulfur adsorption of the OC device 30, and the SCR device 32 (shown in FIG. 1) during a sulfur adsorption cycle and a rate of sulfur desorption when exposed to elevated temperatures (generally over about 500° C.). Sulfur adsorption occurs any time during operation of the engine 12 when the aftertreatment devices are not releasing sulfur during a desulfurization cycle.

The amount of fuel consumed 134 and the amount of oil consumed 138 can be determined by monitoring operation of the engine 12 since the last desulfurization cycle. That is, the amount of fuel consumed 134 represents the cumulative sum of fuel consumed by the engine 12 since the last desulfurization cycle. Likewise, the amount of oil consumed 138 represents the cumulative sum of oil consumed by the engine 12 since the last desulfurization cycle. Both the amount of fuel consumed 134 and the amount of oil consumed 138 are reset after each desulfurization cycle.

The exhaust temperature value 140 may include the operational profiles of after treatment devices such as the OC device 30, and the SCR device 32. Specifically, in one embodiment, the first and second sensors 36, 38 (shown in FIG. 1) send electrical signals to the control module 35 that indicate the temperature profile of the OC device 30, the third and fourth sensors 40, 42 (shown in FIG. 1) send electrical signals to the control module 35 that indicate the temperature profile of the SCR device 32, and the fifth and sixth sensors 44, 46 (shown in FIG. 1) send electrical signals to the control module 35 that indicate the temperature profile of the PF 34. In another embodiment, the control module 35 may include control logic to determine the operational profiles of the OC device 30, the SCR device 32, and the PF device 34 based on operating parameters of the engine 12 (shown in FIG. 1).

The mass adsorbed value 142 is a value calculated by the control module 35, and represents the amount of sulfur that is already adsorbed on the OC device 30, and the SCR device 32

(shown in FIG. 1). The mass adsorbed value 142 is a time integrated value of the amount of sulfur adsorbed (for example at time=0 seconds, there is generally no sulfur adsorbed, but 10 g/s sulfur entering into the catalyst, at time=1 seconds, there are 10 g of sulfur now adsorbed by the catalyst). The sulfur exposure from the fuel value, the sulfur exposure from oil value, the capture rate value, the amount of fuel consumed value 134, the amount of oil consumed 138, the exhaust temperature value 140, and the mass adsorbed value 142 are used to calculate the rate of sulfur adsorption.

The exhaust mass flow 144 is based on the intake air mass of the engine 12 (measured by the intake air mass airflow sensor 24 shown in FIG. 1) and the fuel mass flow of the engine 12. In another embodiment, the input 144 into the stored sulfur model 108 may be the exhaust gas space velocity, which is measured in units of inverse time (e.g., generally 1/hour). The exhaust gas space velocity is the volumetric flow rate of the exhaust gas 15 divided by the volume of the catalyst.

The desulfurization control module 110 is configured to control desulfurization of at least one aftertreatment device of FIG. 1 based on the desulfurization request 124 received from the desulfurization mode trigger module 106. As described in U.S. patent application Ser. No. 13/671,889, filed Nov. 8, 2012 to Funk et al., entitled "EXHAUST GAS AFTER-TREATMENT DESULFURIZATION CONTROL", the desulfurization control module 110 outputs a desulfurization mode 146 to the fuel injection control module 114 to control desulfurization. The desulfurization control module 110 receives the regeneration mode 118 from the regeneration control module 104, the total amount of sulfur 136 from the stored sulfur model 108, and parameters from the memory 102. The desulfurization control module 110 can also receive an interrupt from the interrupt module 112. Using the regeneration mode 118, the desulfurization control module 110 can initiate desulfurization concurrently with or immediately succeeding regeneration of the PF device 34 in the exhaust gas treatment system 10 of FIG. 1.

The desulfurization mode 146 may be set until the interrupt module 112 interrupts the desulfurization, the total amount of sulfur 136 is less than a lower sulfur threshold received from memory 102, or a desulfurization duration elapses. Based on an interrupt condition 148, the desulfurization is halted and prevented from resuming until a next regeneration of the PF device 34 or a next desulfurization request 124 is received. Interrupt conditions 148 may be temperature based and can use one or more of the sensors 36-46 compared relative to one or more temperature threshold values stored in the memory 102. For example, a sensed temperature above about 800° C. may result in an interrupt. Other temperature values, such as a coolant temperature of engine 12 of FIG. 1 can also be monitored by the interrupt module 112. The interrupt generated by the interrupt module 112 can be sent to either or both of the regeneration control module 104 and the desulfurization control module 110.

The fuel injection control module 114 outputs a fuel injection control signal 150 to control in cylinder post injection in the engine 12 of FIG. 1. In cylinder post injection generates exhaust temperatures to remove stored sulfur from one or more aftertreatment devices and/or to regenerate the PF device 34 illustrated in FIG. 1. The fuel injection control module 114 can access values in the memory 102 to set the fuel injection control signal 150 based on the regeneration mode 118 and the desulfurization mode 146. The memory 102 may include a separate desulfurization temperature setpoint map and a correction map to an in-cylinder post injection quantity used to perform the PF device 34 regeneration process. The desulfurization mode 146 may use existing combustion control software used during cylinder post injection PF regeneration. Using existing combustion control software in combination with separate temperature setpoints and a correction map reduces an amount of the memory 102 used to implement the desulfurization mode 146 with respect to existing combustion control software for the regeneration mode 118.

Figure 3:
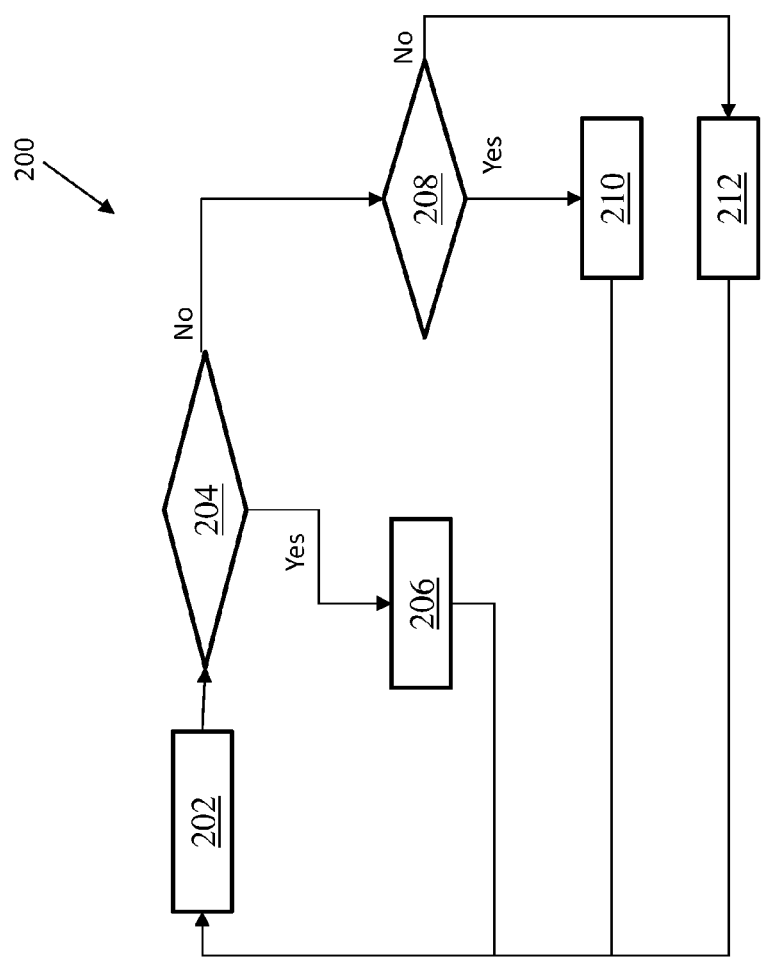
FIG. 3 is flowchart diagram illustrating a method of performing efficiency diagnostics for an SCR device in accordance with exemplary embodiments.

Turning to FIG. 3, and with continued reference to FIGS. 1 and 2, a flowchart illustrates a method 200 of performing efficiency diagnostics for the SCR device 32 that can be performed by the control module 35 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

As illustrated at block 202, the method 200 begins by determining the amount of sulfur in the SCR device 32. In one embodiment, the amount of sulfur in the SCR device 32 may be determined by the stored sulfur model 108. In exemplary embodiments, the amount of sulfur in the SCR device 32 may be calculate based on the time, distance, or fuel consumption since the last regeneration of the exhaust gas treatment system 10. Next, as shown at decision block 204, the method 200 includes determining if the amount of sulfur in the SCR device 32 is greater than a first threshold value. In exemplary embodiments, the first threshold value is selected to be an amount of sulfur high enough to cause the SCR diagnostics module 152 to indicate a potential issue in the operation of the SCR device 32. If the amount of sulfur in the SCR device 32 is greater than a first threshold value, the method 200 proceeds to block 206 and disables the SCR diagnostics module 152. After the SCR diagnostics module is disabled, the method 200 returns to block 202 and the controller 35 continues to monitor the amount of sulfur in the SCR device 32.

In exemplary embodiments, decision block 204 of the method 200 may also include determining if the frequency of PF regenerations is less than a lower threshold. If the frequency of PF regenerations is less than the lower threshold, the method 200 proceeds to block 206 and disables the SCR diagnostics module 152. In exemplary embodiments, the lower threshold is selected to be a frequency of PF regenerations that would be low enough to allow for sufficient sulfur build up to cause the SCR diagnostics module 152 to indicate a potential issue in the operation of the SCR device 32. After the SCR diagnostics module is disabled, the method 200 returns to block 202 and the controller 35 continues to monitor the amount of sulfur in the SCR device 32.

In exemplary embodiments, decision block 204 of the method 200 may also include determining if the desulfurization systems is in active mode, or in other words, if a PF regeneration is currently being performed. If the desulfurization system is in active mode, the method 200 proceeds to block 206 and disables the SCR diagnostics module 152. Otherwise, the method 200 may proceed to decision block 208.

As shown at decision block 208, the method includes determining if the amount of sulfur in the SCR device 32 is greater than a second threshold value. In exemplary embodiments, the second threshold value is less than the first threshold value. In exemplary embodiments, the second threshold value is selected to be an amount of sulfur high enough that it may cause the SCR diagnostics module 152 to indicate a potential issue in the operation of the SCR device 32. If the amount of sulfur in the SCR device 32 is not greater than the second threshold value, the method proceeds to block 212 and operates the SCR diagnostics module 152 normally. The method 200 then proceeds back to block 202 and the controller 35 continues to monitor the amount of sulfur in the SCR device 32. If the amount of sulfur in the SCR device 32 is greater than the second threshold value, the method proceeds to block 210 and operates the SCR diagnostics module 152 with a correction factor applied to the efficiency diagnostic threshold.

In exemplary embodiments, decision block 208 of the method 200 may also include determining if the frequency of PF regenerations is less than a higher threshold. If the frequency of PF regenerations is greater than, or equal to, a higher threshold, the method 200 proceeds to block 212 and operates the SCR diagnostics module 152 normally. The method 200 then proceeds back to block 202 and the controller 35 continues to monitor the amount of sulfur in the SCR device 32. If the frequency of PF regenerations is less than the higher threshold, the method proceeds to block 210 and operates the SCR diagnostics module 152 with a correction factor applied to the efficiency diagnostic threshold. In exemplary embodiments, the higher threshold is selected to be a frequency of PF regenerations that may be low enough to allow for sufficient sulfur build up to cause the SCR diagnostics module 152 to indicate a potential issue in the operation of the SCR device 32.

As shown block 210, the method 200 includes applying a correction factor to scale the efficiency diagnostics threshold of the SCR diagnostics module 152. The efficiency diagnostics threshold is a minimum efficiency level of the SCR device that is maintained in order for the SCR diagnostics module 152 to not indicate a possible potential issue in the operation of the SCR device 32. In exemplary embodiments, the correction factor is designed to lower the efficiency diagnostics threshold based on the amount of sulfur in the SCR device 32 exceeding the second threshold device. In exemplary embodiments, by lowering the efficiency diagnostics threshold when the amount of sulfur in the SCR device 32 is above the second threshold, the possibility that the SCR diagnostics module 152 falsely indicates a potential issue in the operation of the SCR device 32 is decreased. In exemplary embodiments, the correction factor may be based on the frequency of regeneration of the SCR device or on the amount of sulfur in the SCR device 32. The method 200 then proceeds back to block 202 and the controller 35 continues to monitor the amount of sulfur in the SCR device 32.

In exemplary embodiments, the controller 35 may also be configured to report the sulfur storage content of the exhaust gas treatment system 10 to a separate service module (not shown), such as through the OBDII connector. In addition, the sulfur storage content of the exhaust gas treatment system 10 can be added to the ECM potential issue in the operation record for SCR efficiency diagnostics to help determine root cause of SCR operational errors in the operations in the field. In exemplary embodiments, a service procedure will include having a service technician check the sulfur content of the exhaust gas treatment system 10 by accessing the service module. If the service module indicates that a sulfur limit has been exceeded, the service technician will perform service regeneration before following the service procedure for SCR catalyst efficiency diagnostics.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A controller for operating an exhaust gas treatment system included with an internal combustion engine, the controller comprising:
    a stored sulfur module configured to determine an amount of sulfur in a selective catalytic reduction ("SCR") device of the exhaust treatment system;
    a SCR diagnostics module configured to monitor an efficiency of the SCR device and to indicate a failure of the SCR device when the efficiency of the SCR device falls below an efficiency diagnostics threshold; and
    a desulfurization mode trigger module configured to configured to set a desulfurization request based one or more trigger conditions, including the amount of sulfur in the SCR device;
    wherein an operation of the SCR diagnostics module is disabled if the amount of sulfur in the SCR device is above a first threshold to prevent a false indication of the failure of the SCR device.

2. The controller of claim 1, wherein the efficiency diagnostics threshold of the SCR diagnostics module is scaled by a correction factor based on determining that the amount of sulfur in the SCR device is above a second threshold and below the first threshold.

3. The controller of claim 2, wherein the correction factor is based on the amount of sulfur in the SCR device.

4. The controller of claim 1, wherein in response to detecting desulfurization of the SCR device, the SCR diagnostics module is disabled.

5. The controller of claim 1, wherein the operation of the SCR diagnostics module is disabled based on a frequency of regeneration of a particulate filter ("PF") of the exhaust gas treatment being below a lower frequency threshold.

6. The controller of claim 5, wherein the efficiency diagnostics threshold of the SCR diagnostics module is scaled by a correction factor based on determining that one or more of:
    a frequency of regeneration of a particulate filter ("PF") of the exhaust gas treatment being below a higher frequency threshold; and
    the amount of sulfur in the SCR device being above a second threshold.

7. The controller of claim 5, further comprising disabling the SCR diagnostics module in response to detecting a desulfurization of the SCR device.

8. A method for performing diagnostics of a selective catalytic reduction ("SCR") device in an exhaust gas treatment system of an internal combustion engine, the method comprising:
    monitoring an amount of sulfur in the SCR device of the exhaust treatment system;
    monitoring, by an SCR diagnostics module, an efficiency of the SCR device and indicating a failure of the SCR device when the efficiency of the SCR device falls below an efficiency diagnostics threshold; and
    executing a desulfurization on the SCR device based one or more trigger conditions, including the amount of sulfur in the SCR device;
    based on determining that the amount of sulfur in the SCR device is above a first threshold, disabling an operation of the SCR diagnostics module to prevent a false indication of the failure of the SCR device.

9. The method of claim 8, further comprising scaling the efficiency diagnostics threshold by a correction factor based on determining that the amount of sulfur in the SCR device is above a second threshold and below the first threshold.

10. The method of claim 9, wherein the correction factor is based on the amount of sulfur in the SCR device.

11. The method of claim 8, further comprising disabling the SCR diagnostics module in response to detecting desulfurization of the SCR device.

12. The method of claim 8, further comprising disabling the operation of the SCR diagnostics module based on a frequency of regeneration of a particulate filter ("PF") of the exhaust gas treatment being below a lower frequency threshold.

13. The method of claim 12, further comprising scaling the efficiency diagnostics threshold by a correction factor based on determining that one or more of:
   a frequency of regeneration of a particulate filter ("PF") of the exhaust gas treatment being below a higher frequency threshold; and
   the amount of sulfur in the SCR device being above a second threshold.

14. The method of claim 12, further comprising disabling the SCR diagnostics module in response to detecting desulfurization of the SCR device.

15. A controller for operating an exhaust gas treatment system included with an internal combustion engine, the controller comprising:
   a stored sulfur module configured to determine an amount of sulfur in a selective catalytic reduction ("SCR") device of the exhaust treatment system; and
   a SCR diagnostics module configured to monitor an efficiency of the SCR device and to indicate a failure of the SCR device when the efficiency of the SCR device falls below an efficiency diagnostics threshold; and
   a desulfurization mode trigger module configured to configured to set a desulfurization request based one or more trigger conditions, including the amount of sulfur in the SCR device;
   wherein an operation of the SCR diagnostics module is disabled if a frequency of regeneration of a particulate filter ("PF") of the exhaust gas treatment is below a lower threshold to prevent a false indication of the failure of the SCR device.

16. The controller of claim 15, wherein the efficiency diagnostics threshold of the SCR diagnostics module is scaled by a correction factor based on determining that the frequency of regeneration of the PF is above a lower threshold and below a higher threshold.

17. The controller of claim 16, wherein the correction factor is based on the frequency of regeneration of the PF.

18. The controller of claim 15, further comprising disabling the SCR diagnostics module in response to detecting a desulfurization of the SCR device.

19. The controller of claim 15, wherein the operation of the SCR diagnostics module is disabled based on the amount of sulfur in the SCR device being above a first threshold.

20. The controller of claim 19, wherein the efficiency diagnostics threshold of the SCR diagnostics module is scaled by a correction factor based on determining that one or more of:
   a frequency of regeneration of a particulate filter ("PF") of the exhaust gas treatment being below a higher frequency threshold; and
   the amount of sulfur in the SCR device being above a second threshold.

* * * * *